(12) United States Patent
Boros

(10) Patent No.: US 6,401,876 B1
(45) Date of Patent: Jun. 11, 2002

(54) VEHICLE EMERGENCY BRAKE AND ANTI-JACKKNIFE SYSTEM

(76) Inventor: James A. Boros, 880 E. 209 St., Euclid, OH (US) 44119-2406

( * ) Notice: Subject to any disclaimer, the term of this patent is extended or adjusted under 35 U.S.C. 154(b) by 0 days.

(21) Appl. No.: 09/562,869

(22) Filed: May 1, 2000

Related U.S. Application Data

(60) Provisional application No. 60/135,581, filed on May 24, 1999.

(51) Int. Cl.$^7$ ................................................ B60T 1/14
(52) U.S. Cl. ............................ 188/5; 188/2 R; 188/32; 188/8
(58) Field of Search ............................ 188/32, 5, 4 R, 188/2 R, 8

(56) References Cited

U.S. PATENT DOCUMENTS

| | | | | |
|---|---|---|---|---|
| 2,687,191 A | * | 8/1954 | Shannon | 188/234 |
| 2,710,074 A | * | 6/1955 | Simpson | 188/5 |
| 4,133,414 A | * | 1/1979 | Ushitani | 188/5 |
| 4,296,840 A | * | 10/1981 | Payne | 188/8 |
| 4,896,749 A | * | 1/1990 | Walker | 188/5 |

FOREIGN PATENT DOCUMENTS

| | | | | |
|---|---|---|---|---|
| IT | 553729 | * | 1/1957 | 188/5 |
| JP | 01262238 | * | 10/1989 | 188/5 |

* cited by examiner

*Primary Examiner*—Paul N. Dickson
*Assistant Examiner*—Mariano Sy
(74) *Attorney, Agent, or Firm*—Tarolli, Sundheim, Covell, Tummino & Szabo, L.L.P.

(57) ABSTRACT

A ground-engaging emergency brake and anti-jackknife system for a vehicle comprises a brake skid which has at least one elongated substantially planar rigid base member, and upper and lower planar surfaces. A replaceable traction member is removably affixed to the base member lower planar surface. A linkage mechanism positions the brake skid in a ground-engaging deployed plane which is parallel to the plane of the vehicle, and when retracted, in a position adjacent to the underside of the vehicle. An actuating mechanism actuates the brake skid between the deployed and retracted positions. The brake skid is centered axially with respect to the longitudinal axis of the vehicle between the rear wheels of the vehicle. The actuating mechanism and linkage mechanism are effective to place a substantial amount of the vehicle weight on the brake skid when the brake skid is in its deployed position.

5 Claims, 4 Drawing Sheets

VEHICLE EMERGENCY BRAKE AND ANTI-JACKKNIFE SYSTEM

CROSS REFERENCE TO RELATED APPLICATION

This application claims the benefit of U.S. Provisional Application Serial No. 60/135,581, filed on May 24, 1999.

BACKGROUND OF THE INVENTION

1. Technical Field

The present invention relates to a ground engaging emergency brake system for a vehicle. The emergency brake system of the present invention is particularly useful for tractor-trailer rigs.

2. Description of the Prior Art

U.S. Pat. No. 4,325,465 discloses an auxiliary braking device for a highway tractor-trailer. The device has a drag shoe which comprises an elongated metal plate covered with a replaceable elastomeric sheath. The sheath has a high coefficient of friction with a road surface. The drag shoe is supported on the frame of the trailer transversely across the trailer in front of the rear wheels of the trailer. When released, the drag shoe is guided into the path of the rear wheels for the purpose of bringing the tractor-trailer to a stop. Most of the trailer weight on the drag shoe will be concentrated in the areas directly beneath the trailer tires limiting the effectiveness of the drag shoe.

A similar device is disclosed in U.S. Pat. No. 4,825,978.

SUMMARY OF THE INVENTION

The present invention is a ground engaging emergency brake and anti-jackknife system for a vehicle. The brake system comprises a brake skid which, in turn, comprises at least one elongated substantially planar rigid base member having upper and lower planar surfaces. A replaceable traction member is removably affixed to the base member lower planar surface. A linkage mechanism positions the brake skid, when fully deployed, in a ground engaging plane parallel to the plane of the vehicle, and when retracted, in a position adjacent to the underside of the vehicle. The vehicle has a longitudinal axis. The brake skid is centered along the longitudinal axis contiguous with the rear of said vehicle, preferably between the rear wheels of the vehicle. The system comprises an actuating mechanism for actuating the brake skid between said fully deployed and retracted positions. The actuating mechanism and linkage mechanism are effective to place at least a substantial amount of the vehicle weight on the brake skid when the brake skid is in its fully deployed position.

The present invention is particularly useful with a tractor-trailer rig.

BRIEF DESCRIPTION OF THE DRAWINGS

The present invention and advantages thereof will become more apparent from the following description with reference to the accompanying drawings in which.

DESCRIPTION OF PREFERRED EMBODIMENTS

Figure 1:
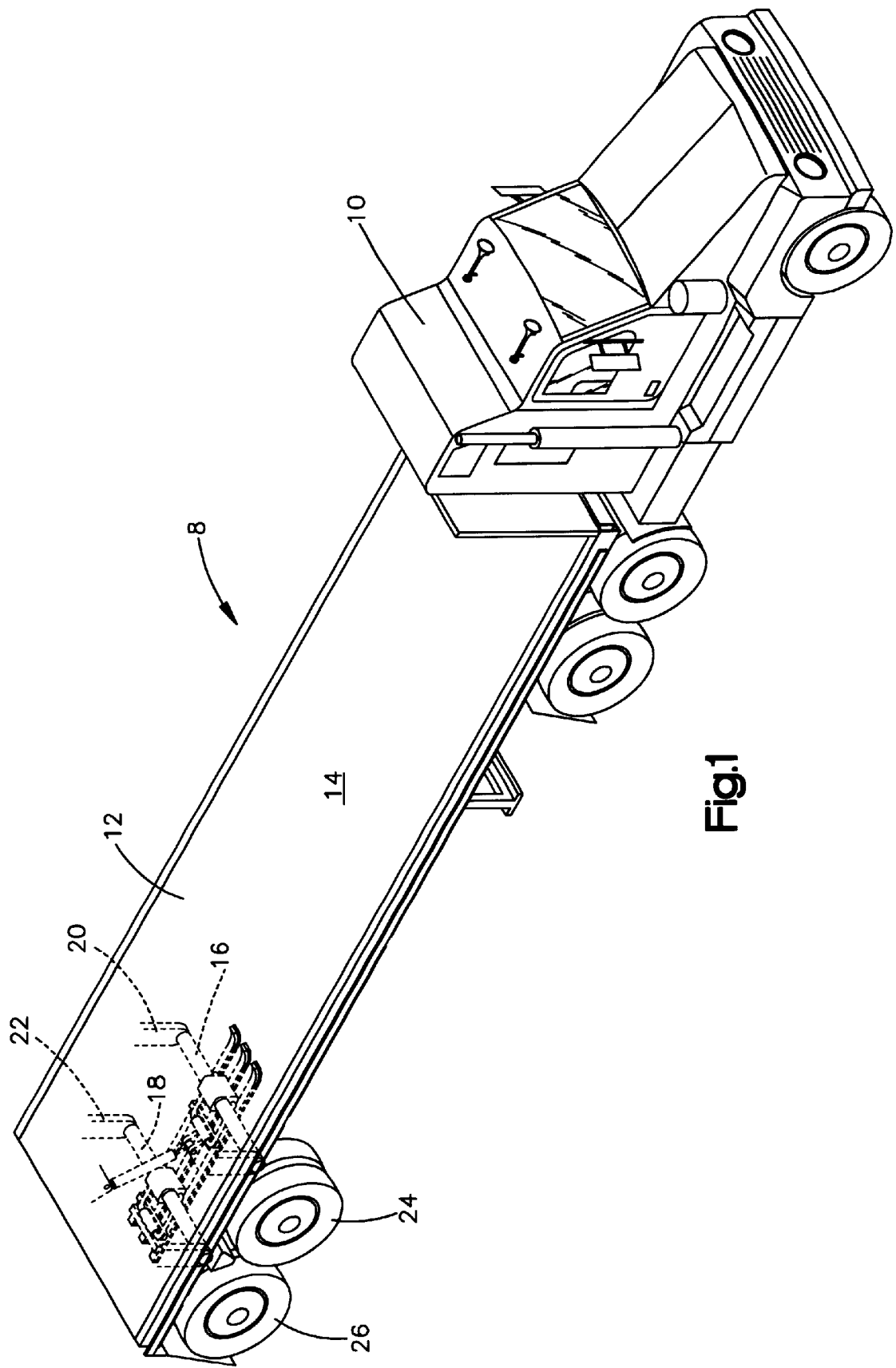
FIG. 1 is a top perspective view of a tractor-trailer showing the brake system of the present invention in phantom lines, in accordance with one embodiment of the present invention.

Referring to FIG. 1, the tractor-trailer rig 8 comprises a tractor 10 and a trailer 12. The trailer 12 comprises a trailer bed 14. The trailer comprises tandem rear axles 16 and 18, and axle suspensions 20 and 22 for the axles 16 and 18, connected to the underside of the bed 14. Pairs of rear wheels 24 and 26 are mounted on the axles 16 and 18.

Figure 2:
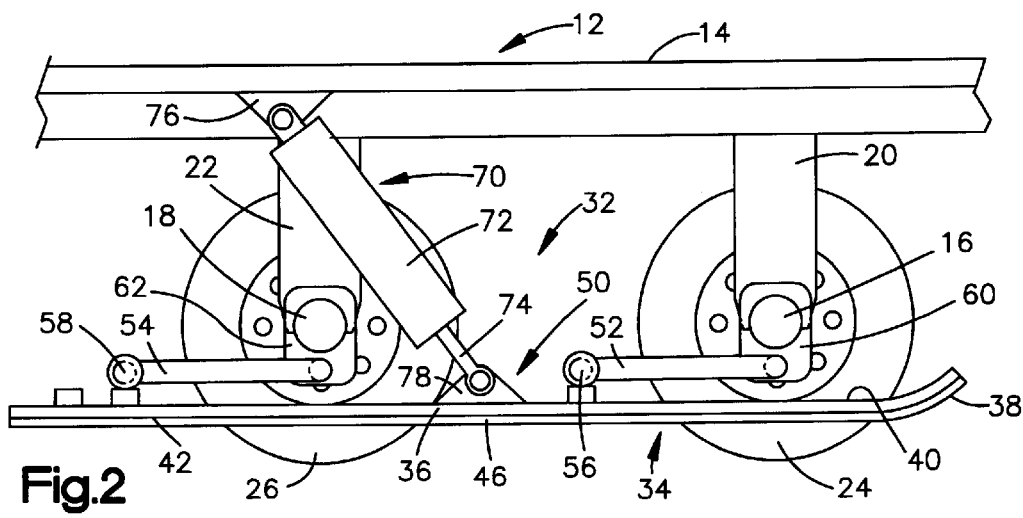
FIG. 2 is a side elevation view of a portion of the trailer of FIG. 1, with the wheels removed on one side, showing the brake skid of the present invention in a retracted position.
Figure 3:
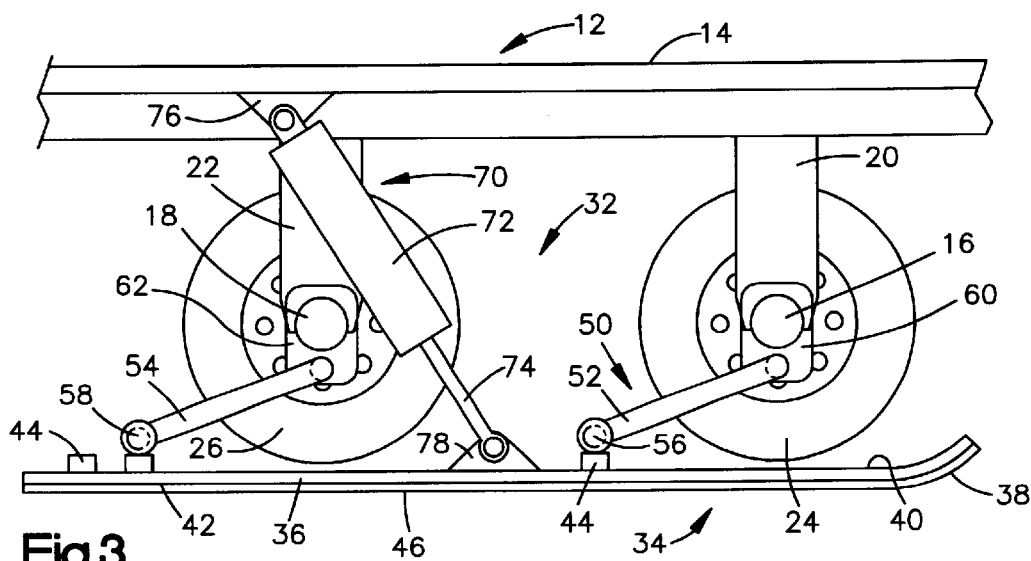
FIG. 3 is a side elevation view of the trailer of FIG. 2 showing the brake skid of the present invention in a fully deployed position.

Referring to FIGS. 2 and 3, only the wheels 24 and 26 on the far left side of the trailer 12 are shown, for purposes of description. The wheels on the right side of the trailer have been removed to expose the details of the underside of the trailer 12.

The arrangement of tandem rear axles 16 and 18 is common for a trailer adapted to handle heavy loads. The axles 16 and 18 are spaced apart a distance which is sufficient to accommodate the wheels 24 and 26.

The axle suspensions 20 and 22, which are shown schematically in the Figures, are air-ride suspensions positioned at opposite ends of the axles 16 and 18, between the axles and the trailer bed 14. A conventional leaf spring suspension can also be used.

The emergency brake system of the present invention is broadly designated with the number 32 and is positioned on the underside of the trailer bed 14. The brake system 32 comprises an elongated brake skid 34 which has a longitudinal axis parallel to the longitudinal axis of the trailer 12. In the embodiment shown in the Figures, the skid 34 comprises three spaced-apart parallel, rigid metal (e.g., steel) base members 36 (see FIG. 4), hereinafter referred to as skis 36. The center ski 36a is positioned axially with respect to the axis of the trailer 12. The side skis 36b and 36c are on opposite sides of the center ski 36a. Each of the skis 36 has an upturned front end 38 (FIG. 2), a top side 40 which faces the underside of the trailer 12, and a bottom side 42 which faces the roadway on which the trailer is riding.

The skis 36 are fastened together by a pair of spaced-apart bars 44 which extend laterally across the topside of the skis and are welded or otherwise fastened to the skis.

The dimensions of the brake skid 34 are such that it fits easily between the rear wheels 24 and 26 of the trailer 12. The length of the brake skid 34 can vary. Preferably, it is at least as long as the distance between the two rear axles 16 and 18 of the trailer 12.

The bottom side 42 of each of the skis 36 is fitted with a replaceable traction member 46. The traction member 46 can be of an elastomeric material which has a high coefficient of friction with the roadway. Studs or abrasive particles (not shown) can be embedded in the traction member 46 to further increase its coefficient of friction. The traction member 46 can be adhered to the underside of each of the skis 36 by a suitable adhesive or by means of suitably positioned bolts. The traction member 46 is adapted for release from the skis 36 and replacement with a new friction traction member, for instance, by heating the adhesive, or releasing the bolts.

The brake skid 34 is attached to the underside of the trailer bed 14 by a linkage mechanism broadly indicated with the number 50. The linkage mechanism comprises a front pair of arms 52 and a rear pair of arms 54. All of the arms 52 and 54 are preferably equal in length. The skis 36 have front pivot connections 56 and rear pivot connections 58. The pivot connections 56 and 58 are bar-like members which extend across the top sides of the skis 36 and are fastened to the top side of each of the skis, for instance by welding. The pivot connection 58 is spaced rearwardly from the pivot connection 56 a distance which is, approximately the same as the distance between axles 16 and 18. The front arms 52 are pivotally connected, at their lower ends, to opposite ends of the front pivot connection 56, and the rear arms 54 are pivotally connected, at their lower ends, to opposite ends of the rear pivot connection 58.

The front and rear axles 16 and 18, on their underside, are fitted with pivot connections 60 and 62, which are similar in configuration to the pivot connections 56 and 58 attached to skid 34. The upper ends of the pairs of arms 52 and 54 are pivotally connected to the pivot connections 60 and 62.

The linkage mechanism 50 causes the brake skid 34 to remain generally in a plane parallel to that of the trailer bed 14 when the brake skid 34 is actuated to a retracted position adjacent to but underneath the axles 16 and 18, as shown in FIG. 2, or when fully deployed to an operative position, against the road surface and away from the axles 16 and 18, as shown in FIG. 3, or to any position intermediate a retracted or fully deployed position. An important feature of the present invention is that the pivot connections 56 and 58 are spaced rearwardly of axles 16 and 18 so that the pivot arms 52 and 54 trail rearwardly from the axles 16 and 18.

Figure 4:
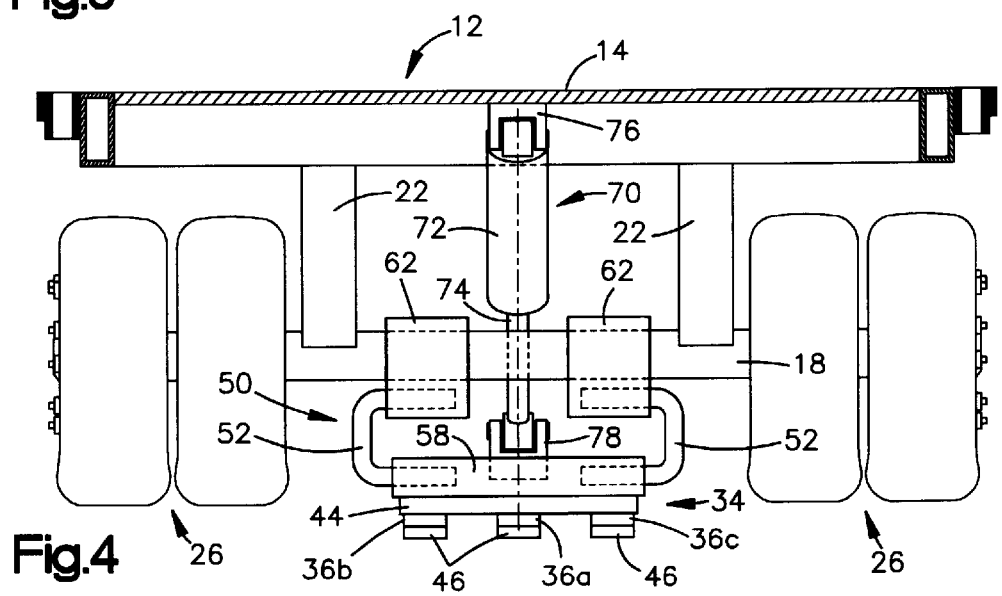
FIG. 4 is a rear view of the trailer of FIG. 3.

The actuating mechanism for lowering and raising the brake skid 34 from the retracted and deployed positions is broadly designated with the number 70. The mechanism 70 is centered axially with respect to the trailer 12, as shown in FIG. 4. The mechanism 70 comprises a hydraulic cylinder 72 and a piston rod 74 which moves axially into or out of the hydraulic cylinder 72 in a conventional manner. The hydraulic cylinder 72 is pivotally affixed to member 76 on the underside of the trailer 12, at a point above and slightly rearward of the trailer rear axle 18. The piston rod 74 is pivotally and axially affixed to a connection member 78 on the top side of the centermost ski 36a at a point behind the front connection member 56. Connected in this way, the actuating mechanism faces forward and downward when the brake skid 34 is fully deployed as in FIG. 3.

In operation, the brake skid 34 moves upwardly and rearwardly when the hydraulic cylinder is retracted, and forwardly and downwardly when the hydraulic cylinder 72 is actuated to expel the piston rod 74 from its retracted position.

As the arms 52 and 54 keep the skid 34 in a plane which is parallel to the trailer bed during such movement, the movement of the connection point between the piston rod 74 and the skid 34 remains in approximately a straight line preventing binding between the hydraulic cylinder 72 and piston rod 74.

When the brake skid 34 is fully deployed, the hydraulic cylinder 72 and piston rod 74 are oriented in a forward and downward direction. The fully deployed position of the brake skid 34 is one in which, as shown in FIG. 3, at least a substantial portion of the weight of the trailer 12 is taken off of the wheels and transmitted to the brake skid 34 through the hydraulic cylinder 72 and piston rod 74. In this way, the weight is exerted as an angled forward and downward force to maintain maximum contact between the brake skid and roadway thereby offering maximum resistance to forward movement of the trailer 12.

By positioning the emergency braking system 32 at the rear end of the trailer and axially with respect to the trailer, the drag caused by the emergency braking system forces the trailer rear end back into alignment with the forward movement of the tractor-trailer rig. This inhibits jackknifing of the tractor-trailer rig.

In this respect, the tractor-trailer rig can be provided with motion sensors adapted to sense when a jackknife occurs, emitting a signal which is transferred to the actuating mechanism for deployment of the emergency braking system of the present invention.

By using a skid and positioning it axially with respect to the trailer bed, between wheels 24, 26, it can be made as long as needed to provide effective stopping. By way of example, the brake skid 34 can have a surface area of about 14 square feet, many times as much surface area contacting the ground as provided by the trailer wheels. This provides substantially greater braking power than provided by the trailer wheels.

By utilizing the original suspension system of the trailer, the emergency braking system of the present invention can be lighter in weight than prior proposed brake systems.

By using multiple skis, for instance three, for the brake skid 34, the brake skid 34 is better able to adjust to or compensate for road unevenness, providing a balanced contact with the road surface. The multiple ski arrangement also helps avoid any tendency of the emergency braking system of the present invention to hydroplane.

By making the traction member 46 easily replaceable, it can be changed for different road conditions, for instance one type of traction member for winter driving conditions and a different type of traction member for summer driving conditions.

Figure 5:
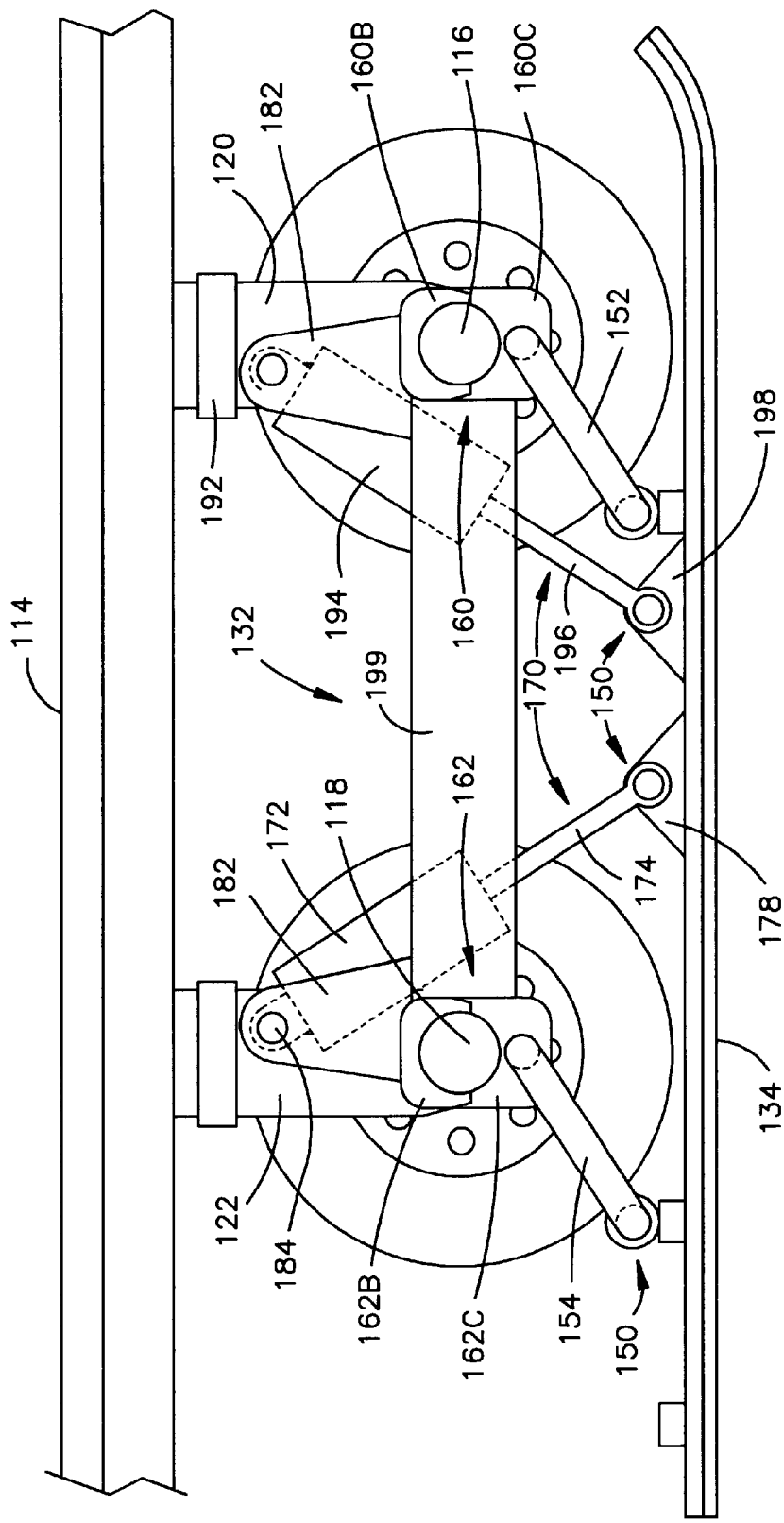
FIG. 5 is a side elevation view of a portion of the trailer of FIG. 1 showing the brake skid in accordance with a second embodiment of the present invention.
Figure 6:
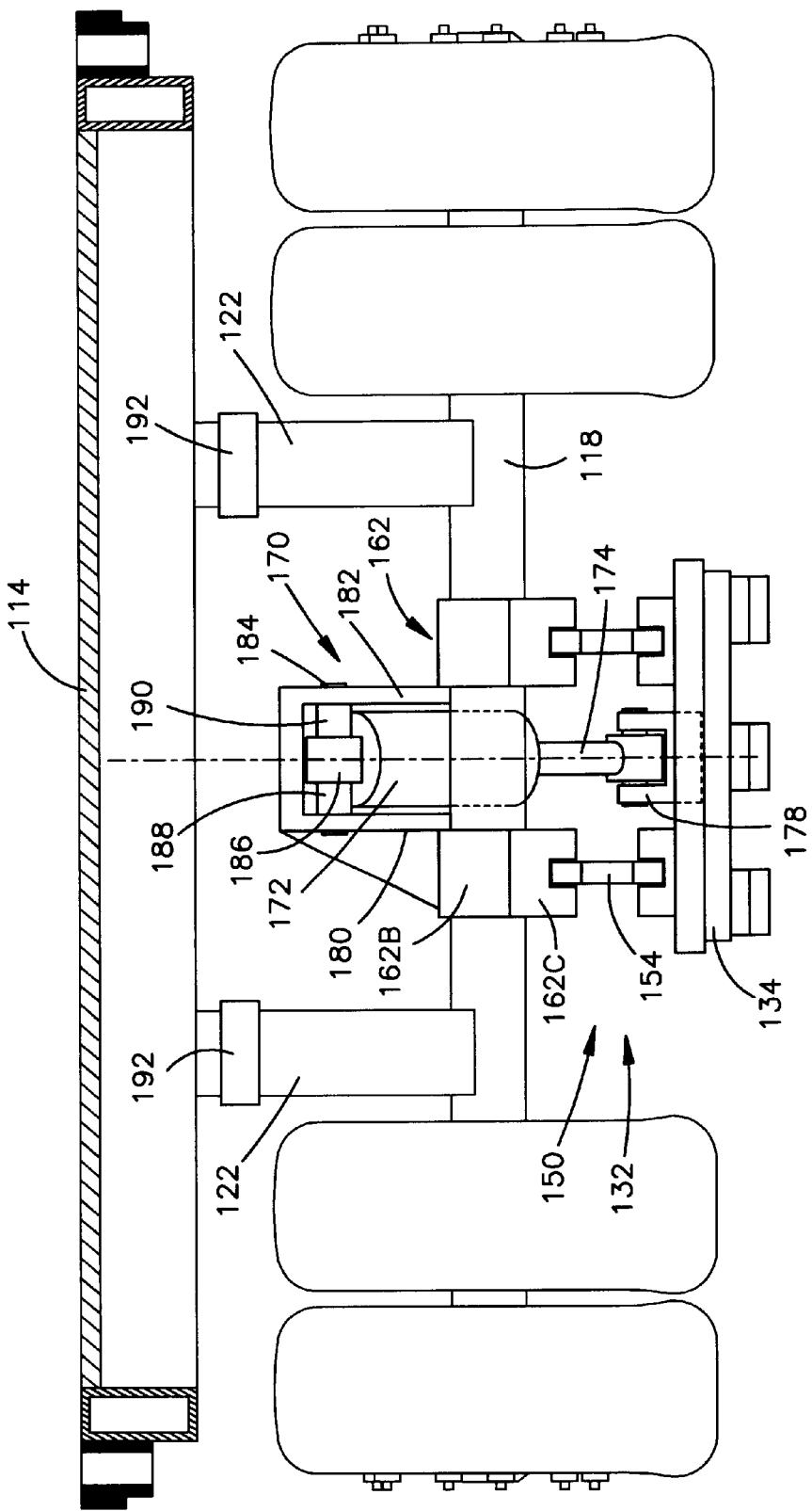
FIG. 6 is a rear view of the trailer of FIG. 5.

A second embodiment of the present invention is shown in FIGS. 5 and 6. In the following description of the second embodiment, like components, similar to those of the first embodiment of FIGS. 1–4, will be given the same number, preceded by the numeral one, e.g., trailer bed 114.

The linkage mechanism 150, connecting the skid 134 of the emergency braking system 132 to the trailer bed 114, comprises front arms 152 and rear arms 154 as in the embodiment of FIGS. 1–4. The arms 152 and 154 connect at their upper ends to front and rear clamps 160 and 162, which in turn clamp on to the trailer front and rear axles 116 and 118. Each clamp 160, 162 comprises a top cap 160B, 162B and a bottom cap 160C, 162C. The top and bottom caps are bolted together around the front and rear axles 116, 118. Each axle has two clamps, spaced apart from each other, aligned with the arms 152, 154, as shown in FIG. 6. The arms 152 and 154 pivotably connect to the bottom caps 160C and 162C.

The top caps 160B and 162B have on each of their inner edges upwardly extending mounting brackets 180 and 182, shown in FIG. 6. Bracket 180 is welded to the inner edge of the lefthand cap, in FIG. 6, and bracket 182 is welded to the inner edge of the righthand cap of FIG. 6. The dimensions of the clamps 160 and 162, and their locations on axles 116 and 118, are such that the left and right brackets 180 and 182 are spaced apart. The brackets 180 and 182 extend upwardly to a point which is about in line with the tops of the trailer tires.

A pin 184 (FIG. 6) extends between the upper ends of the mounting brackets 180 and 182. The hydraulic cylinder 172 of the actuating mechanism 170 comprises a lug 186 at its upper end which pivotably connects to pin 184.

Bushings 188 and 190 are positioned on opposite sides of the lug 186, between the lug 186 and mounting brackets 180 and 182.

As shown in FIG. 6, the positioning of the clamps 162 on the axle 118, and dimensions of the clamps, are such as to space the left and right mounting brackets 180 and 182 a distance apart which is slightly greater than the diameter of the hydraulic cylinder 172, thus accommodating the hydraulic cylinder which extends upwardly and rearwardly between the brackets, as shown in FIG. 5.

The piston rod 174 for the hydraulic cylinder 172 connects at its lower end to connection member 178 attached to the upper side of skid 134.

In this embodiment of the present invention, the actuating mechanism 170 comprises a second hydraulic cylinder 194 and piston rod 196 therefor (see FIG. 5). The piston rod 196 at its lower end attaches pivotably to a connection member 198. The connection member 198 is mounted on the upper side of skid 134. The hydraulic cylinder 194 pivotably connects to mounting bracket (only bracket 182 is shown in FIG. 5) on front axle 116 similar to the arrangement described with respect to the rear axle 118.

As shown in FIG. 5, the hydraulic cylinder 194 and piston 196 are angled upwardly and forwardly. A pair of rigid beams 199 extend horizontally between the front and rear clamps 160 and 162 to prevent the axles 116 and 118 from moving apart due to the opposite thrusts of hydraulic cylinders 172 and 194.

The advantage of this embodiment of the present invention is that the actuating mechanism 170, which includes both hydraulic cylinders 172 and 194 and piston rods 174 and 196 therefor, is connected to the trailer suspension system 120, 122 which includes air cushions 192. This allows vibration of the skid 134, caused by road unevenness, to be absorbed by the trailer suspension system and air cushions 192 maintaining better contact between the braking skid 134 and road surface.

Variations and modifications of the present invention will be apparent to those skilled in the art. For instance, even though the present invention has been described with respect to use with a tractor trailer rig, the present invention has utility with other vehicles subject to rear end sideways skidding, for instance, police cars used for high speed chases. Application of the brake skid of the present invention to the road surface which is between the rear wheels of the police car will prevent side ways skidding of police car in an emergency braking situation.

From the above description of the invention, those skilled in the art will perceive other improvements, changes and modifications. Such other improvements, changes and modifications within the skill of the art are intended to be covered by the appended claims.

Having described the invention, the following is claimed:

1. A ground-engaging emergency brake and anti-jackknife system for a trailer having a frame and having a rear wheel assembly that includes forward and rear axles, the forward axle having respective left and right wheels with open space between them and the rear axle having respective left and right wheels with open space between them, the trailer also including a suspension that resiliently suspends the rear wheel assembly on the frame for vertical movement relative to the frame, said system comprising:

a brake skid comprising at least one elongated substantially planar rigid base member having a lower surface and a replaceable traction member removably affixed to said base member lower surface;

said brake skid having a retracted position supported off the roadway in a position adjacent to the underside of the trailer and centered transversely in the open space between the left and right wheels of the forward and rear axles of the rear wheel assembly;

said system comprising a linkage mechanism supporting said brake skid for movement between the retracted position and a deployed position in which said brake skid is located in a ground-engaging plane and is centered transversely in the open space between the left and right wheels of the forward and rear axles of the rear wheel assembly;

said linkage mechanism and thereby said brake skid being supported completely on the forward and rear axles, and thereby being supported completely by the vehicle suspension for vertical movement with the forward and rear axles relative to the frame of the trailer;

said system further comprising an actuating mechanism for moving said brake skid between the retracted position and the deployed position, said actuating mechanism including at least one piston-cylinder assembly connected between the brake skid and another part of said linkage mechanism;

said actuating mechanism being supported completely on the forward and rear axles, and thereby being supported completely by the vehicle suspension for vertical movement with the forward and rear axles relative to the frame of the trailer;

said brake skid when in the deployed position supporting a substantial amount of the weight of the trailer and thereby removing from the left and right wheels of the rear wheel assembly a substantial amount of the weight of the trailer, the weight supported by said brake skid being transferred through said linkage mechanism and through said actuating mechanism to the forward axle and the rear axle; and a substantially rigid assembly extending horizontally between the forward axle and the rear axle and interconnecting the forward axle and the rear axle to block relative movement between the forward axle and the rear axle, said rigid assembly transferring, between the forward axle and the rear axle, load received by the forward axle and by the rear axle from said linkage mechanism and said actuating mechanism.

2. A system as set forth in claim 1 wherein said brake skid comprises at least three separate, substantially planar rigid base members each having a lower surface and each having a replaceable traction member removably affixed to a respective lower surface, a central one of said base members being located on a front-to-back centerline of the vehicle.

3. A system as set forth in claim 2 wherein said actuating mechanism comprises two piston-cylinder assemblies connected between said brake skid and another part of said linkage mechanism, said two piston-cylinder assemblies having axes that do not extend parallel to each other.

4. A system as set forth in claim 3 wherein said linkage mechanism comprises:

front and rear pivot centers contiguous with the opposite sides of said brake skid affixed to said base member upper planar surface;

four elongated pivot arms comprising first and second ends attached at said first end to each of said pivot centers, said pivot arms being of equal length; and a pivot connection for each of said pivot arm second end affixed to the underside of said vehicle, said pivot connections having the same spacing on the underside of the trailer as the pivot centers on said brake skid.

5. A system as set forth in claim 1 wherein said substantially rigid assembly comprises a pair of rigid beams that extend horizontally between the forward axle and the rear axle and interconnect the forward axle and the rear axle.

* * * * *